United States Patent
Nagatomi et al.

[11] 3,811,864
[45] May 21, 1974

[54] DIPHENYL ETHER HERBICIDAL COMPOSITIONS

[75] Inventors: Makoto Nagatomi; Takayuki Isogawa; Nobuo Onodera, all of Tokyo; Nobuo Ishikawa, Yokohama, all of Japan

[73] Assignee: Hodogaya Chemical Co., Ltd., Tokyo, Japan

[22] Filed: Dec. 27, 1971

[21] Appl. No.: 212,624

[30] Foreign Application Priority Data
Dec. 28, 1970 Japan.............................. 45-11937

[52] U.S. Cl................................ 71/124, 260/612 D
[51] Int. Cl............................................ A01n 9/24
[58] Field of Search................... 71/124; 260/612 D

[56] References Cited
UNITED STATES PATENTS

| 3,401,031 | 9/1968 | Inoue et al............................ 71/124 |
| 3,454,392 | 7/1969 | Kato et al............................. 71/124 |
| 3,131,166 | 4/1964 | Harris et al........................... 71/124 |
| 3,351,670 | 11/1967 | Belf...................................... 260/612 R |

FOREIGN PATENTS OR APPLICATIONS

| 15,000 | 8/1966 | Japan................................... 71/124 |

OTHER PUBLICATIONS
Yakobson et al., "Aromatic Nucleophilic Substitution etc.," (1967), CA 68, No. 21346m (1968).

Primary Examiner—Glennon H. Hollrah
Attorney, Agent, or Firm—Ladas, Parry, Von Gehr, Goldsmith & Deschamps

[57] ABSTRACT

Novel diphenyl ether derivatives having the formula,

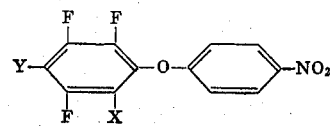

wherein X and Y are individually a fluorine or chlorine atom, provided that X is a fluorine atom when Y is a fluorine atom and is a fluorine or chlorine atom when Y is a chlorine atom, which are prepared by reacting a pentahalogenophenol having the formula,

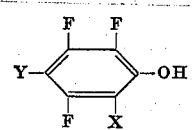

wherein X and Y are defined above, with a p-nitrohalogenobenzene at an elevated temperature in the presence of a deacidifying agent.

A new herbicidal composition comprising a herbicidal amount of at least one compound represented by the formula,

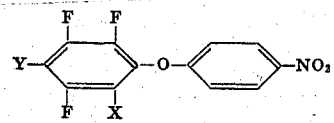

wherein X and Y are as defined above.

9 Claims, No Drawings

DIPHENYL ETHER HERBICIDAL COMPOSITIONS

This invention relates to novel diphenyl ether derivatives and to herbicidal compositions containing said derivatives as active ingredients.

More particularly, the invention pertains to a herbicidial composition containing as an active ingredient at least one compound selected from the group consisting of pentafluorophenyl 4-nitrophenyl ether, 4-chloro-2,3,5,6-tetrafluorophenyl 4-nitrophenyl ether and 4,6-dichloro-2,3,6-trifluorophenyl 4-nitrophenyl ether.

Heretofore, herbicidal compositions containing various compounds as active ingredients have been developed and put into practical use. In actual application, however, not many of said compositions satisfy all of various conditions required for crop cultivation. For example, diphenyl ether type compounds have been developed in large numbers and, as the result of examination in herbicidal activity thereof, some of them are being used in practice. These compounds are ordinarily used as active ingredients in amounts of 200 to 400 g. per 10 ares. However, they are not only short in suitable application period but also are less in persistence of activity. Moreover, they have such drawbacks as being somewhat low in herbicidal activity on such braod-leaved weeds as monochoria (*Monochoria vaginalis*), etc., and the actual state is such that the said compounds are not satisfactory in practical application.

With an aim to obtain strong herbicidal compositions capable of satisfying the above-mentioned conditions, the present inventors synthesized many compounds and examined their activities on plants to find that the compounds according to the present invention have extremely strong herbicidal activities. Based on this finding, the inventors have accomplished the present invention.

An object of the present invention is to provide novel compounds.

Another object of the invention is to provide herbicidal compositions containing said compounds as active ingredients.

A further object of the invention is to provide a process for killing undesirable weeds by use of said herbicidal compositions.

The compounds of the present invention are diphenyl ether derivatives represented by the formula,

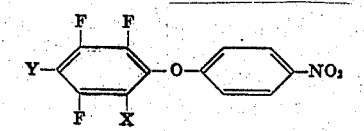

wherein X and Y are individually a fluorine or chlorine atom, provided that X is a fluorine atom when Y is a fluorine atom and is a fluorine or chlorine atom when Y is a chlorine atom.

The present compounds are novel compounds unknown to the literature and can be prepared according to a process carried out by reacting in the presence of a deacidifying agent and at an elevated temperature (a) a hexahalogenobenzene represented by the formula,

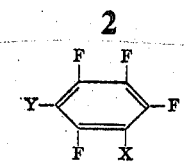

wherein X and Y are as defined above, with p-nitrophenol, or (b) a pentahalogenophenol represented by the formula,

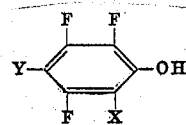

wherein X and Y are as defined above, with a p-nitrohalogenobenzene.

In preparing the present compounds, the hexahalogenobenzene represented by the formula (1) and the p-nitrophenol, or the pentahalogenophenol represented by the general formula (2) and the p-nitrohalogenobenzene, are dispersed in water or dissolved in a solvent, and the resulting dispersion or solvent is incorporated with an equivalent or excess of a deacidifying agent and then reacted at an elevated temperature above room temperature. Alternatively, the present compounds can be obtained, without the use of solvent, by reacting at an elevated temperature a salt of each of the above-mentioned phenols with each of the halides to be reacted therewith.

As the aforesaid solvent, there may be used such a polar solvent as ketone, dimethylformamide, dimethyl sulfoxide or dioxane, or such a solvent as toluene or chlorobenzene. Generally however, the use of the polar solvent is preferable. The amount of the polar solvent to be used is not particularly limited, but is ordinarily 2 to 10 times the weight of the phenol used. As the said deacidifying agent, such an inorganic base as potassium hydroxide, sodium hydroxide, potassium carbonate, sodium carbonate or sodium bicarbonate, or such an organic base as a tertiary amine may be used, but the use of the former is preferable. The reaction temperature varies depending on the kinds of said solvent and deacidifying agent and on the combination of the aforesaid phenol and halide, but is ordinarily in the range from 30° to 100°C. in the reaction of hexahalogenobenzene with p-nitrophenol, and in the range of from 90° to 170°C. in the reaction of pentahalogenophenol with p-nitrohalogenobenzene. In case the halogen in the p-nitrohalogenobenzene is a chlorine atom, the conversion is inferior, in general, and the use of p-nitrofluorobenzene is preferable. The reactants may be used in equimolar amounts, or either one of them may be used in excess. The reaction time greatly varies depending on the reaction conditions, but is sufficiently 3 to 6 hours when the conditions are favorable.

Compounds obtained according to the abovementioned process are as follows:

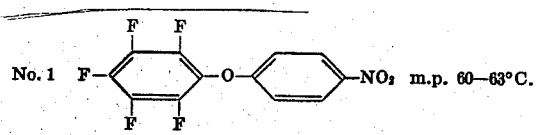

No. 1    m.p. 60–63°C.

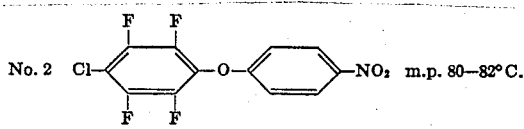

No. 2   Cl—[ring]—O—[ring]—NO₂   m.p. 80–82°C.

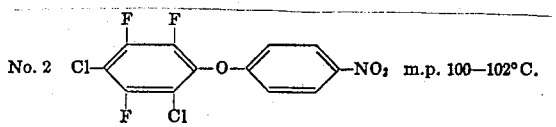

No. 2   Cl—[ring]—O—[ring]—NO₂   m.p. 100–102°C.

According to application purposes, the herbicidal compositions of the present invention can be formulated into preparations capable of being widely usable as agricultural chemicals, such as granules, emulsifiable concentrates, wettable powders, etc. These preparations can be formulated according to ordinary agricultural chemical-preparing techniques by mixing the active ingredients with carriers and, if necessary, incorporating surface active agents into the resulting mixtures. Examples of the carriers used in this case include solid carriers such as diatomaceous earth, Japanese acid clay, kaolin, talc and bentonite, and organic solvents such as xylene, toluene, benzene, chlorobenzene, cyclohexanone, isophorone, methyl hexyl ketone and butyl acetate, and examples of the surface active agents include dispersants, emulsifiers, penetrants and spreaders.

The compositions of the present invention may be used, if necessary, in admixture with other herbicides, and fungicides, insecticides, miticides or fertilizers.

Procedures for synthesizing the present compounds are explained below with reference to examples.

EXAMPLE 1

A mixture comprising 30 g. of pentafluorochlorobenzene, 21 g. of p-nitrophenol, 42 g. of powdery potassium carbonate and 200 ml. of dimethylformamide was fed to a reaction flask, and then reacted with thorough stirring for 3 hours while maintaining the reaction temperature at 75° to 80°C. Subsequently, the reaction liquid was poured into 3 liters of water to liberate an oily substance. This oily substance was extracted with 300 ml. of benzene, washed with water and dehydrated, and then the benzene was removed, whereby 36 g. of crude crystals having a melting point of 76° to 80°C. was obtained. The crude crystals were recrystallized from ethanol to obtain crystals of 4-chlorophenyl-2,3,5,6-tetrafluorophenyl 4-nitrophenyl ether having a melting point of 80° to 82°C.

Elementary analysis:

|  | Cl | F | N |
|---|---|---|---|
| Calculated (%) | 11.04 | 23.64 | 4.35 |
| Found (%) | 11.11 | 23.51 | 4.26 |

According to NMR analysis, two double lines were observed at +66.4 p.p.m. and +79.3 p.p.m., but this showed that there were two fluorine atoms equal in valence, and it was confirmed that the product had the desired structure.

EXAMPLE 2

A mixture comprising 30 g. of pentafluorochlorobenzene, 19 g. of p-nitrophenol, 42 g. of powdery potassium carbonate and 300 ml. of dioxane was fed to a reaction flask, and then maintained with thorough stirring at 90° to 100°C. for 5 hours. Thereafter, the reaction liquid was treated in the same manner as in Example 1 to obtain 33 g. of a crude crystalline produce having a melting point of 77° to 80°C. According to infrared analysis, it was confirmed that the product was identical with that obtained in Example 1.

EXAMPLE 3

A mixture comprising 18.6 g of hexafluorobenzene, 13.9 g. of p-nitrophenol, 30 g. of powdery potassium carbonate and 200 ml. of dimethylformamide was fed to a reaction flask, and then reacted for 6 hours with thorough stirring while maintaining the mixture at 85° to 90°C. Thereafter, the reaction liquid was treated in the same manner as in Example 1, whereby 15 g. of crude crystals having a melting point of 57° to 61°C. was obtained. The thus obtained crude crystals were recrystallized from methanol to obtain pentafluorophenyl 4-nitrophenyl ether having a melting point of 60° to 63°C.

Elementary analysis:

|  | C | H | F | N |
|---|---|---|---|---|
| Calculated (%) | 47.21 | 1.31 | 31.15 | 4.59 |
| Found (%) | 47.30 | 1.36 | 31.00 | 4.68 |

EXAMPLE 4

A mixture comprising 21.9 g. of 2,4,5,6-tetrafluoro-1,3-dichlorobenzene, 12.5 g. of p-nitrophenol, 20 g. of powdery sodium carbonate and 100 ml. of dimethylformamide was fed to a reaction flask, and then reacted with thorough stirring at 70° to 75°C. for 3 hours. Subsequently, the reaction liquid was poured into 1 liter of water to liberate an oily substance. This oily substance was isolated, subjected to steam distillation, and then cooled, and the residue was recovered by filtration, washed with water and then dried, whereby 20 g. of crystals having a melting point of 98° to 101°C. were obtained. The thus obtained crystals were recrystallized from ethanol to obtain 2,4-dichloro-3,5,6-trifluorophenyl 4-nitrophenyl ether having a melting point of 100° to 102°C.

Elementary analysis:

|  | F | Cl | N |
|---|---|---|---|
| Calculated (%) | 16.86 | 21.01 | 4.14 |
| Found (%) | 16.98 | 21.22 | 4.08 |

EXAMPLE 5

A mixture comprising 21.1 g. of 2,4,5,6-tetrafluoro-1,3-dichlorobenzene and 16 g. of potassium salt of p-nitrophenol was fed to a reaction flask, and then reacted with thorough stirring at 100° to 110°C. for 5 hours. Thereafter, the reaction liquid was treated in the same manner as in Example 4, whereby 15 g. of crystals having a melting point of 97° to 100°C. were obtained. The thus obtained crystals were recrystallized from ethanol to obtain a crystalline product having a melting point of 100° to 102°C. This product was mixed with the product obtained in Example 4, but no melting point depression was observed.

EXAMPLE 6

A mixture comprising 19.3 g. of 4-chloro-2,3,5,6-tetrafluorophenol, 13.9 g. of p-nitrofluorobenzene, 100 ml. of dimethylformamide and 20 g. of powdery potassium carbonate was fed to a reaction flask, and reacted with thorough stirring at 120° to 130°C. for 3 hours. Thereafter, the reaction liquid was poured into 1 liter of water to liberate an oily substance. This oily substance was isolated, subjected to steam distillation and then cooled, and the residue was recovered by filtration, washed with water and dried, whereby 12 g. of crystals having a melting point of 78° to 80°C. were obtained. The thus obtained crystals were mixed with the product obtained in Example 1, but no melting point depression was observed.

Procedures for formulating the present herbicidal compositions are explained below with reference to examples, but the scope of the invention is not limited to the examples.

EXAMPLE 7

| | | |
|---|---|---|
| Present compound (No. 1) | 25 | parts by weight |
| Mixed xylene | 35 | do. |
| Methylnaphthalene | 30 | do. |
| Sorpol 900B (trademark of Toho Chemical Co.) | 10 | do. |

The above-mentioned components were mixed and dissolved together to obtain an emulsifiable concentrate of the present compound.

EXAMPLE 8

| | | |
|---|---|---|
| Present compound (No. 3) | 50 | parts by weight |
| White carbon | 2 | do. |
| Kaolin clay | 43 | do. |
| Sorpol 5039 (trademark of Toho Chemical Co.) | 5 | do. |

The above-mentioned components were pulverized and mixed together to obtain a wettable powder of the present compound.

EXAMPLE 9

| | | |
|---|---|---|
| Present compound (No. 3) | 5 | parts by weight |
| Bentonite | 50 | do. |
| Talc | 41 | do. |
| Pellex OTP (trademark of Kao Atlas Co.) | 4 | do. |

The above-mentioned components were pulverized and mixed together, kneaded with water and then granulated by means of a granulator to obtain a granule of the present compound.

EXAMPLE 10

| | | |
|---|---|---|
| Present compound (No. 2) | 5 | parts by weight |
| Finely-divided bentonite | 40 | do. |
| do. zeolite | 51 | do. |
| Pellex OTP (trademark of Kao Atlas Co.) | 4 | do. |

The present compound and Pellex OTP were dissolved in acetone, and the resulting solution was coated by means of a speed kneader on a mixture of the above-mentioned finely divided bentonite and finely divided zeolite to obtain a fine granule preparation of the present compound.

Activities of the present compounds on plants are illustrated below with reference to examples.

EXAMPLE 11

In each of glass Petri dishes of 9 cm. in diameter were placed two qualitative filter papers as germination bed. Separately, each of the compounds according to the present invention and, as controls, pentachlorophenyl 4-nitrophenyl ether (hereinafter referred to as "PCDE"), and 2,4,6-trichlorophenyl 4-nitrophenyl ether (hereinafter referred to as "MO") and 2,4-dichlorophenyl 4-nitrophenyl ether (hereinafter referred to as "NIP") which are active ingredients of known herbicides, was dissolved in a 1 : 1 mixture of xylene and cyclohexanone. The resulting solution was incorporated with Sorpol 800 A (trademark of Toho Chemical Co.) as an emulsifier to prepare a test emulsifiable concentrate. Subsequently, this emulsifiable concentrate was diluted so that the active ingredient concentration thereof became each of 250, 100, 50, 25, 10, 5, 2.5 and 1 p.p.m., and 15 cc. of the resulting composition was charged into the aforesaid Petri dish. Thereafter, seeds of millet (*Echinochloa crusgalli* P. BEAUV. var. *frumentaceae*) as a typical Gramineae plant were sowed in the nursery and allowed to germinate and grow in a growth cabinet kept at 30°C. Five days after the sowing, the state of the plant in each area treated with the composition was visually investigated. The results obtained were as set forth in Table 1, in which the marks have the following significances:

| | |
|---|---|
| ++++ | Non-germination or the plant withered after germination |
| +++ | Marked growth inhibition |
| ++ | Medium growth inhibition |
| + | Slight growth inhibition |
| − | Non-inhibition |

Table 1

| Concentration (p.p.m.) | 250 | 100 | 50 | 25 | 10 | 5 | 2.5 | 1 |
|---|---|---|---|---|---|---|---|---|
| Chemical | | | | | | | | |
| No. 1 | ++++ | ++++ | ++++ | +++ | +++ | ++ | ++ | + |
| No. 2 | ++++ | ++++ | +++ | +++ | +++ | ++ | ++ | + |
| No. 3 | ++++ | ++++ | ++++ | +++ | +++ | ++ | ++ | + |
| MO | ++++ | ++++ | +++ | ++ | ++ | + | ± | − |
| NIP | ++++ | ++++ | +++ | ++ | ++ | + | ± | − |
| PCDE | +++ | ++ | + | − | − | − | − | − |

EXAMPLE 12

Test was effected by use of a test emulsifiable concentrate comprising the following components:

| Present compound | 10 | parts by weight |
|---|---|---|
| Mixed xylene | 50 | do. |
| Cyclohexanone | 30 | do. |
| Sorpol 800 A (trademark of Toho Chemical Co.) | 10 | do. |

Upland field soil (diluvium clay loam) was packed into 1/5,000 are-Wagner pots. Into the soil were sowed to a suitable depth seeds of each of such plants as upland rice (*Oryza sativa L.*), wheat (*Triticum aestivum L.*) azuki bean (*Phaseolus angularis*) and rape (*Brassica napus L.*). On the other hand, seeds of such weeds as millet (*Echinochloa crusgalli P. BEAUV. var. frumentacea*) and clover (*Trifolium repenus L.*) were sufficiently mixed with previously sieved soil, and were uniformly covered on the soil in the pots to a surface layer of 0.5 cm. Subsequently, the aforesaid emulsifiable concentrate according to the present invention was diluted with water and uniformly applied to the soil surface so that the amount of the active ingredient became each of 20, 10 and 5 g. per are. For comparison, MO was formulated into an emulsifiable concentrate of the same composition as in the case of the present compound, and applied in the same manner as above. Thereafter, the pots were placed in a glass greenhouse and, on the 20th day after the application, the response of the plants was visually investigated. The results obtained were as set forth in Table 2, in which the figures have the following significances:

| 10 | Non-germination or the plant withered after germination |
|---|---|
| 8 | Extremely great damage or marked decrease in germination ratio |
| 6 | Great damage |
| 4 | Medium damage |
| 2 | Slight damage |
| 0 | Non-damage |

Table 2

| Test chemical | Dosage (g/are) | Response of plant | | | | | |
|---|---|---|---|---|---|---|---|
| | | Rice | Wheat | Azuki bean | Rape | Millet | Clover |
| No. 2 | 20 | 3 | 3 | 4 | 4 | 10 | 10 |
| | 5 | 0 | 0 | 0 | 0 | 9 | 7 |
| No. 3 | 20 | 2 | 2 | 3 | 1 | 10 | 10 |
| | 5 | 0 | 0 | 0 | 0 | 9 | 6 |
| MO | 20 | 3 | 3 | 2 | 2 | 6 | 0 |
| | 5 | 0 | 0 | 0 | 0 | 0 | 0 |

EXAMPLE 13

Paddy field soil was packed into 1/5,000 are-Wagner pots. Into the soil were sowed seeds of barnyardgrass (*Echinochloa crusgalli*). Further, soil containing seeds of needle spikerush (*Eleocharis acicularis*) was placed on the soil surface, and rice (*Oryza sativa L* variety: "Nihonbare"), which had previously been grown to the four-leaf stage, were transplanted into the soil. Subsequently, water was charged into each pot to a depth of 3 to 4 cm. After the rice plants had rooted, and aqueous dilution of each of the emulsifiable concentrate of Example 8 and an emulsifiable concentrate of MO as a control was charged into the water so that the amount of the active ingredient became each of 20, 10 and 5 g. per are. Thereafter, the pots were placed in a glass greenhouse and, on the 20th day after the application, the response of each plant was visually investigated. The results obtained were as set forth in Table 3, in which the figures have the same significances as in Table 2.

Table 3

| Test compound | Dosage (g/are) | Response of plant | | |
|---|---|---|---|---|
| | | Rice | Barnyardgrass | Needle spikerush |
| No. 1 | 20 | 0 | 10 | 7 |
| | 5 | 0 | 8 | 5 |
| No. 2 | 20 | 0 | 10 | 7 |
| | 5 | 0 | 10 | 5 |
| No. 3 | 20 | 0 | 10 | 8 |
| | 5 | 0 | 10 | 5 |
| MO | 20 | 0 | 10 | 6 |
| | 5 | 0 | 6 | 2 |

Herbicidal effects of the present herbicidal compositions are illustrated below with reference to examples.

EXAMPLE 14

Pre-emergence soil treatment tests in upland field soil of alluvium clay loam were carried out in the following manner:

Seeds of upland rice (*Oryza sativa L.*), peanut (*Arachis hypogaea*) and soybean (*Glycine max*) were sowed into the soil to a depth of 1 to 2 cm. For comparison, seeds of millet, large crabgrass (*Digitaria adscendeus*), white goosefoot (*Chenopodium album L.*) and clover (*Trifolium repeus L.*) were sowed into the soil to a depth within 0.5 cm. from the soil surface. Immediately thereafter, each of emulsifiable concentrates prepared in the same manner as in Example 7 was diluted with water so that the amount of the active ingredient became each of 40, 20 and 10 g. per are, and the resulting aqueous dilution was uniformly sprayed onto the soil surface. As a control, each of emulsifiable concentrates containing PCDE, MO and NIP was also applied in the same manner as above. On the 30th day after the application, the response of each plant was visually investigated. The results obtained were as set forth in Table 4, in which the figures have the following significances:

| | |
|---|---|
| 5 | Non-germination or the plant withered after germination |
| 4 | Extremely great damage |
| 3 | Great damage |
| 2 | Medium damage |
| 1 | Slight damage |
| 0 | Non-damage | transplantation, each of the granule of Example 9 and control granules of PCDE, MO and NIP was sprinkled by hand over the water surface so that the amount of the active ingredient became each of 20 and 15 g. per are. On the 30th day after the application or treatment, the response of each plant was visually investigated. The results obtained were as set forth in Table 5, in which the figures have the same significances as in Table 4.

As is clear from the above examples, the compounds of the present invention not only have extremely strong Table 4

| Test chemical | Dosage (g/are) | Response of plant | | | | | | |
|---|---|---|---|---|---|---|---|---|
| | | Upland rice | Peanut | Soybean | Millet | Large crabgrass | White goosefoot | Colver |
| No. 1 | 40 | 1 | 0 | 2 | 4 | 4 | 2 | 3 |
| | 20 | 0 | 0 | 0 | 3 | 3 | 0 | 0 |
| | 10 | 0 | 0 | 0 | 0 | 0 | 0 | 0 |
| No. 2 | 40 | 2 | 0 | 2 | 5 | 5 | 5 | 5 |
| | 20 | 1 | 0 | 1 | 5 | 5 | 5 | 5 |
| | 10 | 0 | 0 | 0 | 4 | 4.5 | 4 | 4 |
| No. 3 | 40 | 1 | 0 | 1 | 5 | 5 | 5 | 5 |
| | 20 | 0 | 0 | 0 | 4.5 | 5 | 4.5 | 4.5 |
| | 10 | 0 | 0 | 0 | 3 | 3 | 4 | 4 |
| PCDE | 40 | 0 | 0 | 0 | 0 | 1 | 0 | 0 |
| | 20 | 0 | 0 | 0 | 0 | 0 | 0 | 0 |
| | 10 | 0 | 0 | 0 | 0 | 0 | 0 | 0 |
| MO | 40 | 1 | 0 | 1 | 5 | 5 | 3 | 4 |
| | 20 | 0 | 0 | 1 | 3 | 3 | 1 | 2 |
| | 10 | 0 | 0 | 0 | 0 | 0 | 0 | 0 |
| NIP | 40 | 2 | 0 | 1 | 5 | 5 | 4 | 5 |
| | 20 | 1 | 0 | 1 | 3 | 4 | 2 | 3 |
| | 10 | 0 | 0 | 0 | 1 | 1 | 0 | 0 |

Table 5

| Test chemical | Dosage (g/are) | Response of plant | | | | | |
|---|---|---|---|---|---|---|---|
| | | Rice | Barnyard grass | Flat sedge | Monochoria | Toothcup | Needle Spikerush |
| No. 1 | 20 | 0 | 4 | 2 | 0 | 2 | 0 |
| | 15 | 0 | 2 | 0 | 0 | 1 | 0 |
| No. 2 | 20 | 0 | 5 | 5 | 5 | 5 | 5 |
| | 15 | 0 | 5 | 5 | 4.5 | 5 | 4 |
| No. 3 | 20 | 0 | 5 | 5 | 4 | 5 | 4 |
| | 15 | 0 | 5 | 5 | 3 | 5 | 3 |
| PCDE | 20 | 0 | 0 | 0 | 0 | 0 | 0 |
| | 15 | 0 | 0 | 0 | 0 | 0 | 0 |
| MO | 20 | 0 | 4.5 | 4.5 | 3 | 5 | 2 |
| | 15 | 0 | 2 | 2 | 2 | 3 | 0 |
| NIP | 20 | 0 | 4.5 | 4.5 | 4 | 5 | 3 |
| | 15 | 0 | 4 | 2 | 2 | 3 | 1 |

EXAMPLE 15

Into a concrete frame of 50 × 50 cm. was packed paddy field soil containing seeds of barnyardgrass, monochoria, needle spikerush, flat-sedge (*Cyperus microiria*) and toothcup (*Rotala indica*). After puddling, rice (variety: Nihonbare), which had previously been grown to the five- to six-leaf stage, were transplanted to the soil, and water was charged into the concrete frame to a depth of 4 cm. On the 4th day after the activities on plants but also are high in practical selectivity. Although the compounds of the present invention show usefulness as herbicides, it is the great characteristic of the present compounds that they have strong activities on plants. Further, the present compounds are particularly preferable as herbicides for use in pre-emergence treatment. Moreover, another characteristic of the present compounds as compared with other compounds lies in that they have extremely strong herbicidal activities. Considering the fact that pentachlorophenyl 4-nitrophenyl ether has little herbicidal activ-

What is claimed is:

1. A herbicidal composition comprising an inert diluent or carrier and a herbicidally effective amount of an active ingredient selected from the group consisting of compounds represented by the formula

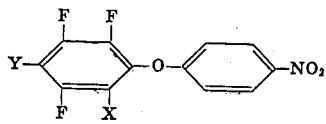

wherein X and Y are individually a fluorine or chlorine atom, provided that at least one of X or Y is a chlorine atom.

2. A herbicidal composition according to claim 1, wherein the compound is 4-chloro-2,3,5,6-tetrafluorophenyl 4-nitrophenyl ether.

3. A herbicidal composition according to claim 1, wherein the compound is 4,6-dichloro-2,3,5-trifluorophenyl 4-nitrophenyl ether.

4. An emulsifiable concentrate comprising an inert liquid diluent and an effective amount of a herbicidally active ingredient selected from the group consisting of compounds represented by the formula

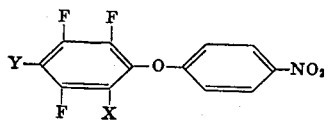

wherein X and Y are individually a fluorine or chlorine atom, provided that at least one of X or Y is a chlorine atom.

5. A wettable powder composition comprising an inert powder containing a surfactant and an effective amount of a herbicidally active ingredient selected from the group consisting of compounds represented by the formula

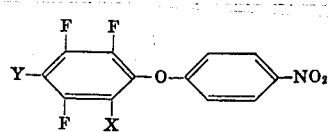

wherein X and Y are individually a fluorine or chlorine atom, provided that at least one of X or Y is a chlorine atom.

6. A granular composition comprising inert granules and an effective amount of a herbicidally active ingredient selected from the group consisting of compounds represented by the formula

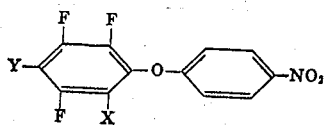

wherein X and Y are individually a fluorine or chlorine atom, provided that at least one of X or Y is a chlorine atom.

7. A method for controlling weeds comprising applying to an area selected for weed control a herbicidally effective amount of a compound represented by the formula

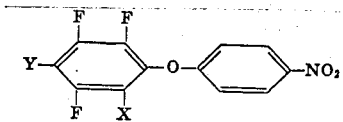

wherein X and Y are individually a fluorine or chlorine atom, provided that at least one of X or Y is a chlorine atom.

8. A method according to claim 4 wherein there is applied 4-chloro-2,3,5,6-tetrafluorophenyl 4-nitrophenyl ether.

9. A method according to claim 4, wherein there is applied 4,6-dichloro-2,3,5-trifluorophenyl 4-nitrophenyl ether.

* * * * *

UNITED STATES PATENT OFFICE
CERTIFICATE OF CORRECTION

Patent No. 3,811,864        Dated May 21, 1974

Inventor(s) Makoto Nagatomi et al

It is certified that error appears in the above-identified patent and that said Letters Patent are hereby corrected as shown below:

In the Foreign Application Priority Data, the number "11937" should read -- 119397 --.

Signed and sealed this 5th day of November 1974.

(SEAL)
Attest:

McCOY M. GIBSON JR.                C. MARSHALL DANN
Attesting Officer                  Commissioner of Patents